(12) United States Patent
Smith et al.

(10) Patent No.: US 11,736,660 B2
(45) Date of Patent: Aug. 22, 2023

(54) CONFERENCE GALLERY VIEW INTELLIGENCE SYSTEM

(71) Applicant: Zoom Video Communications, Inc., San Jose, CA (US)

(72) Inventors: Jeffrey William Smith, Milpitas, CA (US); Chi-chian Yu, San Ramon, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/243,004

(22) Filed: Apr. 28, 2021

(65) Prior Publication Data

US 2022/0353465 A1    Nov. 3, 2022

(51) Int. Cl.
*H04N 7/15* (2006.01)
*H04N 5/262* (2006.01)
(Continued)

(52) U.S. Cl.
CPC ............... *H04N 7/15* (2013.01); *G06T 7/70* (2017.01); *G06V 40/10* (2022.01); *G10L 15/22* (2013.01); *G10L 25/57* (2013.01); *H04N 5/268* (2013.01); *H04N 5/2624* (2013.01); *H04N 7/142* (2013.01); *H04N 23/90* (2023.01); *H04R 1/326* (2013.01); *G06N 20/00* (2019.01);
(Continued)

(58) Field of Classification Search
None
See application file for complete search history.

(56) References Cited

U.S. PATENT DOCUMENTS

| 8,150,155 B2 | 4/2012 | El-Maleh et al. |
| 8,842,161 B2 | 9/2014 | Feng et al. |

(Continued)

FOREIGN PATENT DOCUMENTS

| GB | 2594761 B | 5/2022 |
| WO | 2021243633 A1 | 12/2021 |
| WO | 2022078656 A1 | 4/2022 |

OTHER PUBLICATIONS

International Search Report and Written Opinion dated Jul. 4, 2022 in corresponding PCT Application No. PCT/US2022/024820.
(Continued)

*Primary Examiner* — Stella L. Woo
(74) *Attorney, Agent, or Firm* — Young Basile Hanlon & MacFarlane, P.C.

(57) ABSTRACT

A conference gallery view intelligence system determines regions of interest for display within views of conferencing software based on input streams received from devices within a conference room during a conference. Conference participants are detected in the conference room based on an input video stream received from a video capture device. A direction of audio from the conference participants is determined based on an input audio stream received from a multi-directional audio capture device. A conversational context within the conference room is then determined based on the direction of the audio and locations of the one or more conference participants in the conference room. A region of interest to output within conferencing software is determined based on the conversational context, and the region of interest is output for display within a view of the conferencing software.

20 Claims, 10 Drawing Sheets

(51) Int. Cl.
*G06T 7/70* (2017.01)
*H04N 5/268* (2006.01)
*H04N 7/14* (2006.01)
*H04N 5/247* (2006.01)
*G10L 15/22* (2006.01)
*H04R 1/32* (2006.01)
*G10L 25/57* (2013.01)
*G06V 40/10* (2022.01)
*H04N 23/90* (2023.01)
*G06N 20/00* (2019.01)

(52) U.S. Cl.
CPC ........... *G06T 2207/10016* (2013.01); *G06T 2207/30196* (2013.01); *G10L 2015/227* (2013.01); *G10L 2015/228* (2013.01)

(56) References Cited

U.S. PATENT DOCUMENTS

| | | | |
|---|---|---|---|
| 9,055,189 | B2 | 6/2015 | Su |
| 9,100,540 | B1 | 8/2015 | Gates et al. |
| 9,237,307 | B1 | 1/2016 | Vendrow |
| 9,294,726 | B2 | 3/2016 | Decker et al. |
| 9,591,479 | B1 | 3/2017 | Leavy et al. |
| 9,706,171 | B1 | 7/2017 | Riley et al. |
| 9,769,424 | B2 | 9/2017 | Michot |
| 9,774,823 | B1 | 9/2017 | Gadnir et al. |
| 9,858,936 | B2 | 1/2018 | Cartwright et al. |
| 9,942,518 | B1* | 4/2018 | Tangeland ........... G06K 9/6223 |
| 10,057,707 | B2 | 8/2018 | Cartwright et al. |
| 10,104,338 | B2 | 10/2018 | Goesnar |
| 10,187,579 | B1 | 1/2019 | Wang et al. |
| 10,440,325 | B1* | 10/2019 | Boxwell ................ H04N 5/445 |
| 10,516,852 | B2* | 12/2019 | Theien .................... H04N 7/147 |
| 10,522,151 | B2 | 12/2019 | Cartwright et al. |
| 10,574,899 | B2 | 2/2020 | Wang et al. |
| 10,778,941 | B1 | 9/2020 | Childress, Jr. et al. |
| 10,904,485 | B1* | 1/2021 | Childress, Jr. ....... G06K 9/6271 |
| 10,939,045 | B2 | 3/2021 | Wang et al. |
| 10,991,108 | B2 | 4/2021 | Schnittman et al. |
| 11,064,256 | B1 | 7/2021 | Voss et al. |
| 11,076,127 | B1 | 7/2021 | Schaefer et al. |
| 11,082,661 | B1 | 8/2021 | Pollefeys |
| 11,212,129 | B1 | 12/2021 | Sipcic et al. |
| 11,350,029 | B1 | 5/2022 | Ostap et al. |
| 2009/0210491 | A1 | 8/2009 | Thakkar et al. |
| 2010/0123770 | A1* | 5/2010 | Friel ........................ H04N 7/15 348/14.08 |
| 2010/0238262 | A1 | 9/2010 | Kurtz et al. |
| 2011/0285808 | A1* | 11/2011 | Feng ...................... H04N 7/147 348/14.09 |
| 2012/0093365 | A1 | 4/2012 | Aragane et al. |
| 2012/0293606 | A1 | 11/2012 | Watson et al. |
| 2013/0088565 | A1 | 4/2013 | Buckler |
| 2013/0198629 | A1* | 8/2013 | Tandon ............... G06F 16/4393 715/716 |
| 2016/0057385 | A1* | 2/2016 | Burenius ................ H04N 7/147 348/14.16 |
| 2016/0073055 | A1* | 3/2016 | Marsh .................... H04N 7/152 348/14.08 |
| 2016/0277712 | A1 | 9/2016 | Michot |
| 2017/0094222 | A1 | 3/2017 | Tangeland et al. |
| 2017/0099461 | A1* | 4/2017 | Nimri .................... H04N 7/147 |
| 2018/0063206 | A1 | 3/2018 | Faulkner et al. |
| 2018/0063479 | A1* | 3/2018 | Nimri ................ H04N 5/23238 |
| 2018/0063480 | A1 | 3/2018 | Luks et al. |
| 2018/0098026 | A1* | 4/2018 | Gadnir ................... H04N 7/152 |
| 2018/0225852 | A1 | 8/2018 | Um et al. |
| 2018/0232920 | A1* | 8/2018 | Faulkner ............ H04L 65/1083 |
| 2019/0215464 | A1 | 7/2019 | Kumar et al. |
| 2019/0341050 | A1 | 11/2019 | Diamant et al. |
| 2020/0099890 | A1 | 3/2020 | Tanaka et al. |
| 2020/0126513 | A1 | 4/2020 | Lau et al. |
| 2020/0260049 | A1 | 8/2020 | Erna |
| 2020/0267427 | A1 | 8/2020 | Rogers et al. |
| 2020/0403817 | A1* | 12/2020 | Daredia ................ G10L 15/083 |
| 2021/0120208 | A1* | 4/2021 | Morris .................... H04L 67/38 |
| 2021/0235040 | A1* | 7/2021 | Childress, Jr. ...... G06K 9/00744 |
| 2021/0405865 | A1 | 12/2021 | Faulkner |
| 2021/0409893 | A1 | 12/2021 | Sommer |
| 2022/0086390 | A1 | 3/2022 | Erna et al. |
| 2022/0400216 | A1 | 12/2022 | Wang et al. |
| 2023/0081717 | A1 | 3/2023 | Hoang et al. |

OTHER PUBLICATIONS

International Search Report and Written Opinion dated Jul. 25, 2022 in corresponding PCT Application No. PCT/US2022/024822.
International Search Report and Written Opinion dated Dec. 22, 2022 in corresponding PCT Application No. PCT/US2022/042860.
International Search Report and Written Opinion dated May 8, 2023 in corresponding PCT Application No. PCT/US2023/011368.
Paul Chippendale and Oswald Lanz: "Optimised Meeting Recording and Annotation Using Real-Time Video Analysis", In: Andrej Popescu-Selis: "Machine Learning for Multimodal Interaction", Proc. of 5th MLMI workshop, Sep. 10, 2008 (Sep. 10, 2008), pp. 109-120, XP055543840, Internet Retrieved from the Internet: URL:https://link.springer.com/content/pdf/10.1007/978-3-540-85853-9.pdf [retrieved on Jan. 17, 2019].
Rasmussen Troels Ammitsbol et al: "SceneCam: Improving Multi-camera Remote Callaboration using Augmented Reality", 2019 IEEE International Symposium on Mixed and Augmented Reality Adjunct (ISMAR-ADJUNCT), IEEE, Oct. 10, 2019 (Oct. 10, 2019), pp. 28-33, XP033688529, DOI: 10.1109/ISMAR-ADJUNCT. 2019.00023 [retrieved on Jan. 7, 2020].

* cited by examiner

CONFERENCE GALLERY VIEW INTELLIGENCE SYSTEM

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of conference gallery view intelligence systems and techniques therefor.

One aspect of this disclosure is a method. The method includes detecting one or more conference participants in a conference room based on an input video stream received from a video capture device located within the conference room, determining a direction of audio from the one or more conference participants based on an input audio stream received from a multi-directional audio capture device located within the conference room, determining a conversational context within the conference room based on the direction of the audio and locations of the one or more conference participants in the conference room, determining a region of interest to output within conferencing software based on the conversational context, and outputting the region of interest for display within a view of the conferencing software.

Another aspect of this disclosure is an apparatus. The apparatus includes a memory and a processor configured to execute instructions stored in the memory to detect one or more conference participants in a conference room based on an input video stream received from a video capture device located within the conference room, determine a direction of audio from the one or more conference participants based on an input audio stream received from an audio capture device located within the conference room, determine a region of interest to output within conferencing software based on the direction of the audio and locations of the one or more conference participants in the conference room, and output the region of interest for display within a view of the conferencing software.

Yet another aspect of this disclosure is a non-transitory computer readable storage device. The non-transitory computer readable storage device includes program instructions that, when executed by a processor, cause the processor to perform operations comprising determining a region of interest to output within conferencing software based on locations of one or more conference participants detected within a conference room and direction of audio determined based on voice activity detected within the conference room and outputting the region of interest for display within a view of the conferencing software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
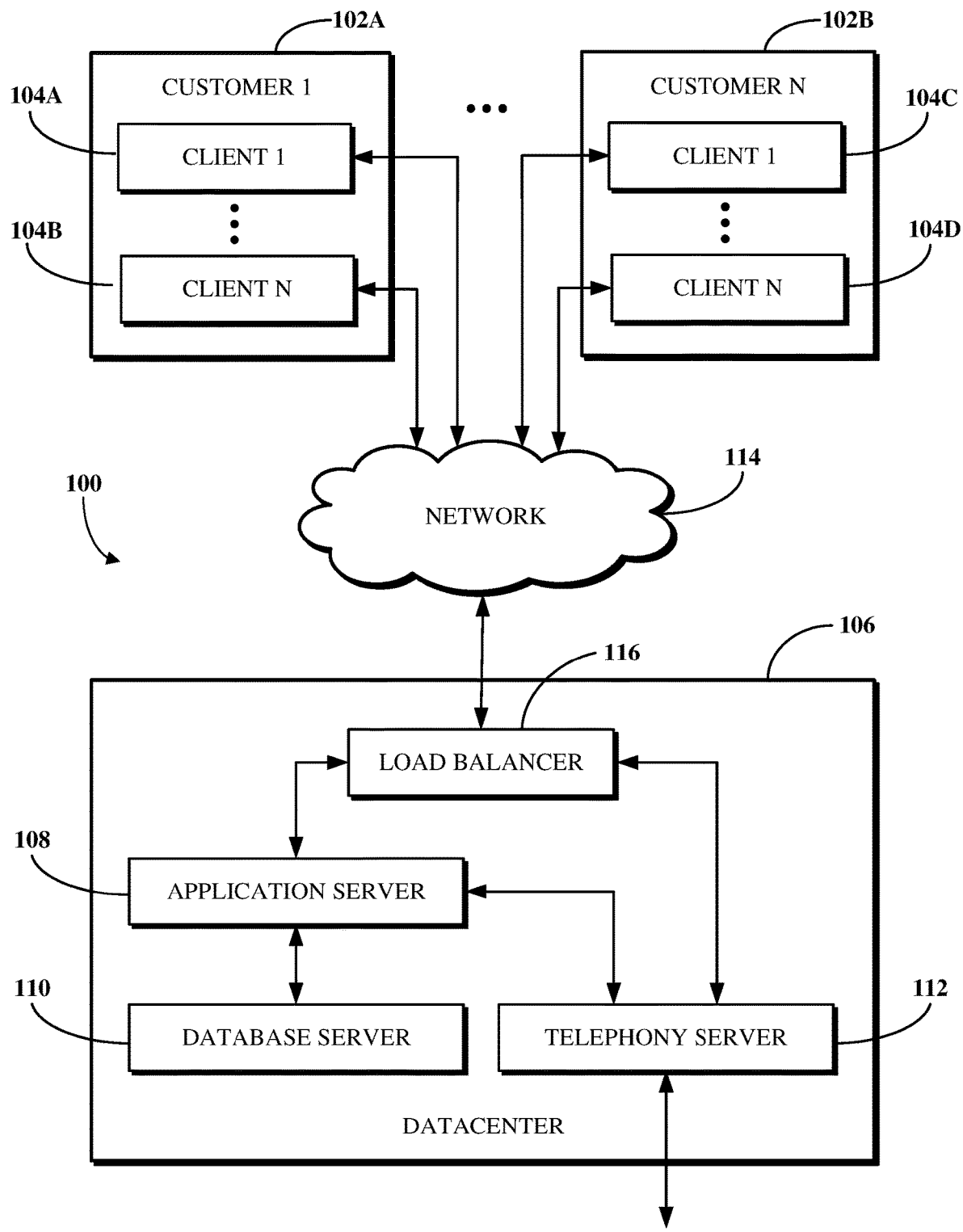
FIG. 1 is a block diagram of an example of an electronic computing and communications system.

Conferencing software is frequently used across a multitude of industries to support conferences between participants in multiple locations. Generally, one or more of the conference participants is physically located in a conference room, for example, in an office setting, and remaining conference participants may be connecting to the conferencing software from one or more remote locations. Conferencing software thus enables people to conduct conferences without requiring them to be physically present with one another. Conferencing software may be available as a standalone software product or it may be integrated within a software platform, such as a UCaaS platform.

Typically, there is a single camera within a conference room, which is usually located in a central position on one side of the conference room so as to capture most or all of the conference room within a field of view thereof, and there may be one or more microphones throughout the conference room to capture sound from persons present in the conference room. These media capture devices are connected to a computing device which transmits streams thereof to a server that implements the conferencing software. The conferencing software then renders an output video stream based on the video feed from the camera within a view of the conferencing software and introduces an audio feed from the one or more microphones within an audio channel of the conference.

Conferencing software conventionally includes a number of views in which video feeds received from the various connected devices are separately rendered within individual views. Conference participants remotely connecting to the conferencing software for a conference are given their own views based on the video feeds received from their devices. In contrast, because a single video feed is received from the camera within a conference room, conference participants who are physically located within the conference room are all shown within the same view.

However, the use of a single view to show all participants in a conference room limits the contribution that those participants have to the overall conference experience. For example, a conference participant located somewhere in the conference room will not be given the same amount of focus within a gallery view layout that shows the various views of the conference as someone who is front and center within their own view. In another example, conversations between participants within the conference room may be missed or misattributed to others by participants who are not present in the conference room.

Implementations of this disclosure address problems such as these using a conference gallery view intelligence system that determine regions of interest for display within views of conferencing software based on input streams received from devices within a conference room during a conference and/or that produces multiple output video streams for rendering within separate views of conferencing software based on regions of interest within the conference room determined based on a single input video stream.

In some implementations of a conference gallery view intelligence system as disclosed herein, conference participants are detected in the conference room based on an input video stream received from a video capture device. A direction of audio from the conference participants is determined based on an input audio stream received from a multi-directional audio capture device. A conversational context within the conference room is then determined based on the direction of the audio and locations of the one or more conference participants in the conference room. A region of interest to output within conferencing software is determined based on the conversational context, and the region of interest is output for display within a view of the conferencing software.

In some implementations of a conference gallery view intelligence system as disclosed herein, at least two regions of interest within a conference room are determined based on an input video stream received from a video capture device located within the conference room. An output video stream for rendering within conferencing software is produced for each of the at least two regions of interest. The output video stream for each of the at least two regions of interest is then transmitted to one or more client devices connected to the conferencing software.

The implementations of this disclosure use one or more video capture devices within a conference room to intelligently focus and feature certain conference participants based on certain criteria, for example, presence, speaking time, or the like. Using one or more video capture devices, various input video streams corresponding to different angles for and thus fields of view of those video capture devices, and various machine learning-driven regions of interest, the implementations of this disclosure can focus on specific conference participants and give them their own views within a conference implemented using conferencing software even if they are all physically located within a conference room. The implementations of this disclosure thus enable a more full, personal experience for each conference participant in a conference room, rather than by combining all of those conference participants within the conference room into a single view for the whole conference room.

To describe some implementations in greater detail, reference is first made to examples of hardware and software structures used to implement a conference gallery view intelligence system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
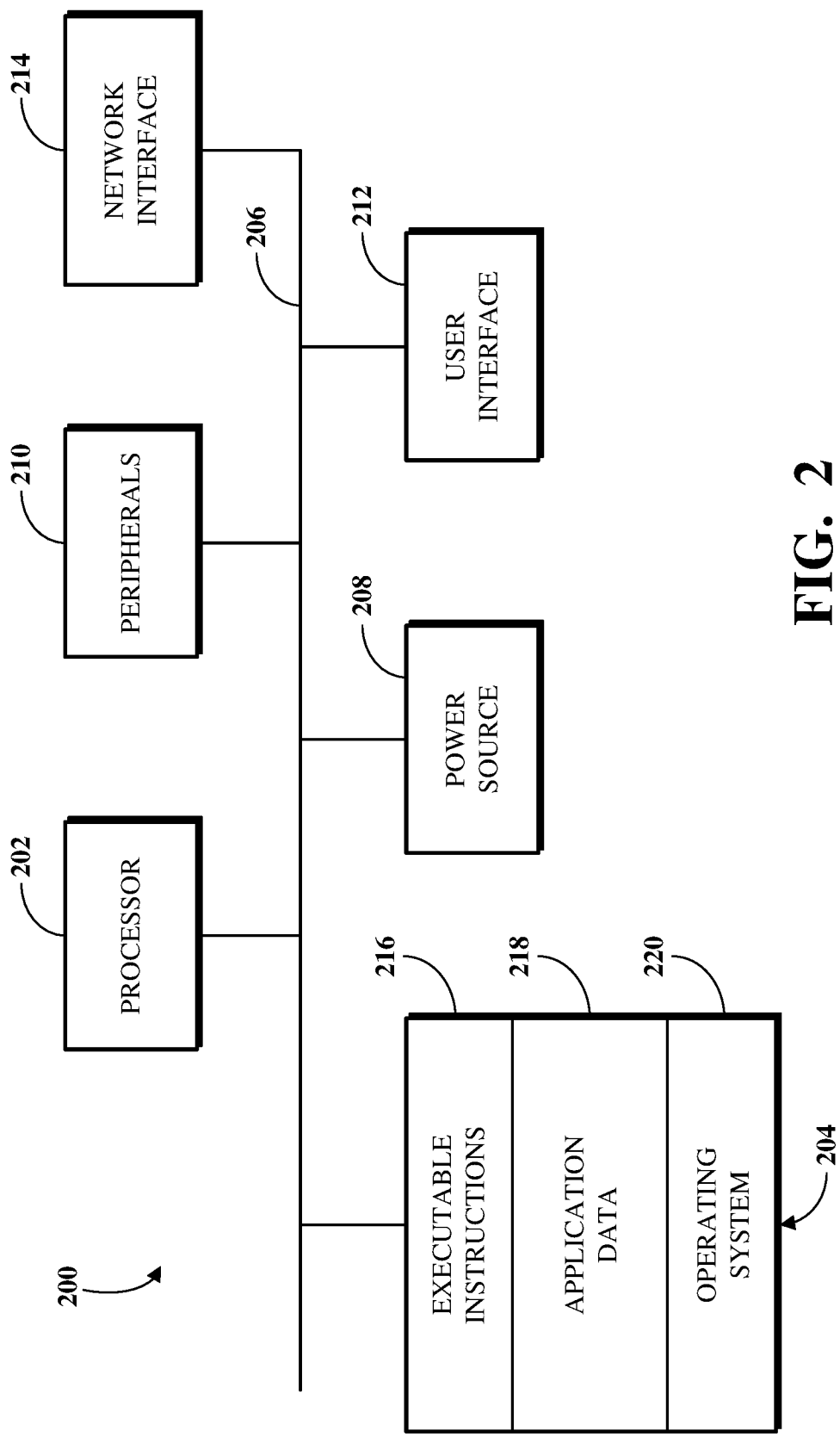
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
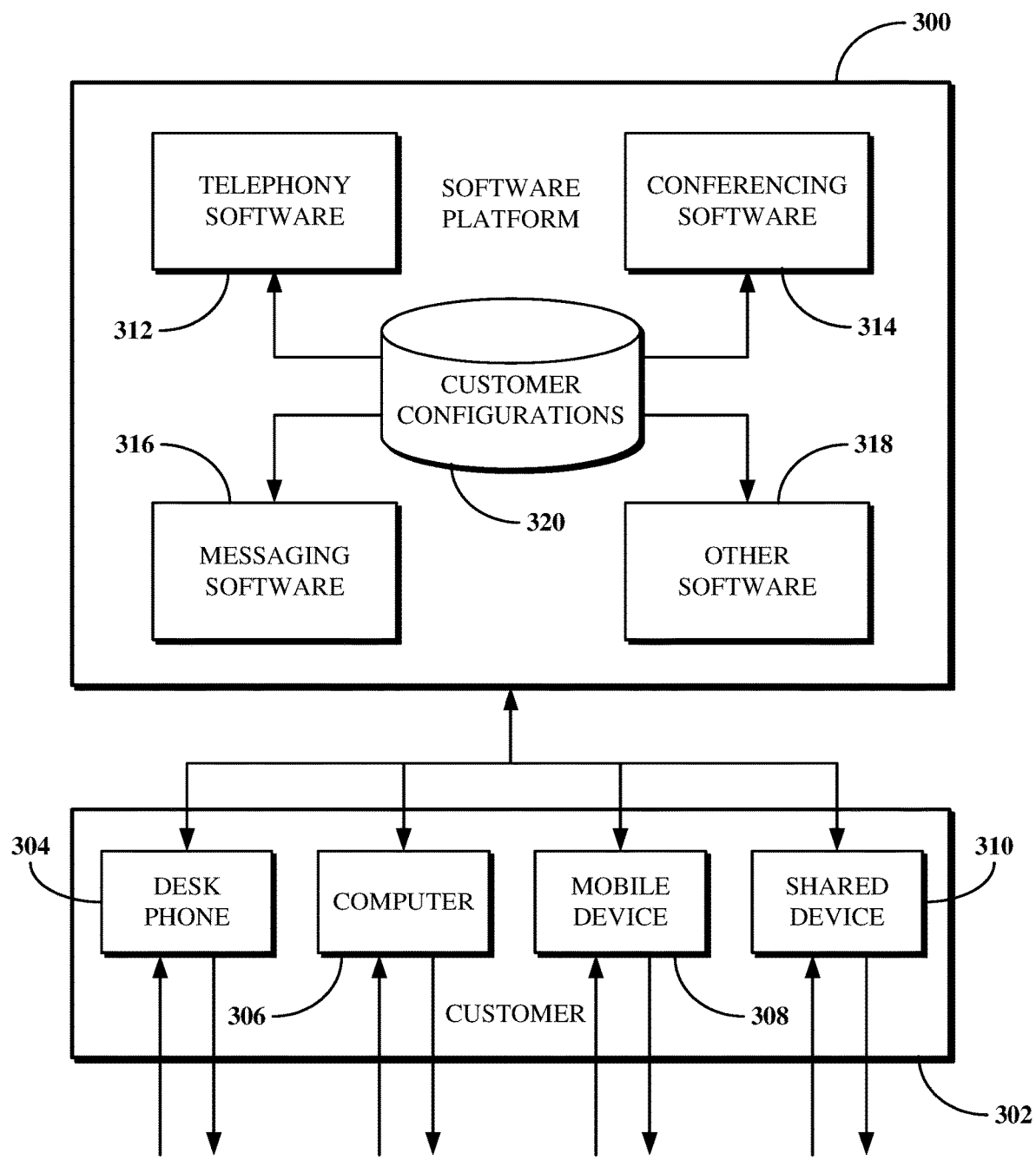
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include conference intelligence software for processing input video and audio streams to determine regions of interest within a conference room and control the content output within gallery views of a conference implemented using the conferencing software 314 based on those regions of interest.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
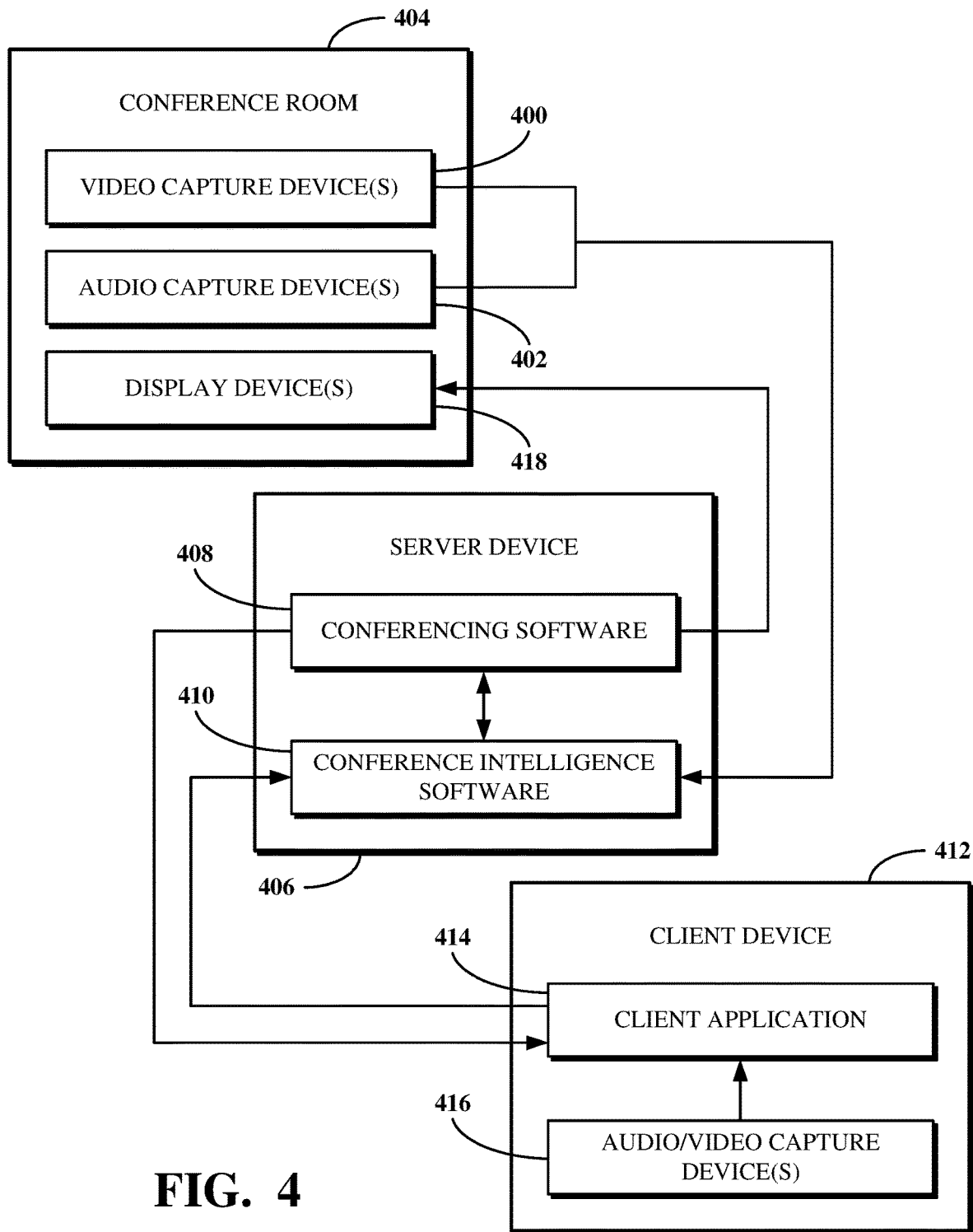
FIG. 4 is a block diagram of devices used with a conference gallery view intelligence system.

FIG. 4 is a block diagram of devices used with a conference gallery view intelligence system. In particular, one or more video capture devices 400 and one or more audio capture devices 402 are respectively used to capture video and audio within a conference room 404, which is a physical space in which one or more conference participants are physically located during at least a portion of the conference. The one or more video capture devices 400 are cameras configured to record video data within the conference room 400. In one example, a single video capture device 400 may be arranged on a wall of the conference room 404. In another example, a first video capture device 400 may be arranged on a first wall of the conference room 404 and a second video capture device 400 may be arranged on a second wall of the conference room 404 perpendicular to the first wall. The one or more audio capture devices 402 are microphones or microphone arrays (e.g., including multiple microphones) configured to record audio data within the conference room. For example, In one example, an audio capture device 402 may be centrally located within the conference room 404, such as on top of a table or other surface.

Each video capture device 400 has a field of view within the conference room 404 based on an angle and position of the video capture device 400. The video capture devices 400 may be fixed such that their respective fields of view do not change. Alternatively, one or more of the video capture devices 400 may have mechanical or electronic pan, tilt, and/or zoom functionality for narrowing, broadening, or changing the field of view thereof. For example, the pan, tilt, and/or zoom functionality of a video capture device 400 may be electronically controlled, such as by a device operator or by a software intelligence aspect, such as a machine learning model or software which uses a machine learning model for field of view adjustment.

A server device 406, which may, for example, be a server at the datacenter 106 shown in FIG. 1, runs software including conferencing software 408 and conference intelligence software 410. The conferencing software 408, which may, for example, be the conferencing software 314 shown in FIG. 3, implements a conference with two or more participants in which one or more of those participants are in the conference room 404 and one or more of those participants are located external to the conference room 404. The conference intelligence software 410 includes functionality for processing input streams from devices of conference participants, determining regions of interest within one or more of those input streams, and controlling the outputting of content within views of a gallery view layout displayed by the conferencing software 408. In some implementations, the conferencing software 408 can include the conference intelligence software 410.

The input streams processed by the conference intelligence software 410 include input streams from the one or more video capture devices 400, input streams from the one or more audio capture devices 402, and input streams from client devices of conference participants located external to the conference room 404, such as a client device 412 which may, for example, be one of the clients 304 through 310 shown in FIG. 3 The client device 412 runs a client application which communicates with the conferencing software 408 to enable an operator of the client device 412 to participate in the conference implemented using the conferencing software 408. The client device also includes one or more audio and/or video capture devices 416, such as cameras, microphones, and the like, which capture media at the client device 412 that the client application 414 transmits in an input stream to the conference intelligence software 410. The server 406 receives the input video streams captured the one or more video capture devices 400 and the input audio streams captured using the one or more audio capture devices 402 from a computing device in communication with the one or more video capture devices 400 and with the one or more audio capture devices 402. For example, the computing device may be a computer located within the conference room 404 or external to the conference room 404.

The conference intelligence software 410 determines gallery view layouts for the conferencing software 408 to cause to be displayed at one or more displays, such as a display of the client device 412 and one or more display devices 418 at the conference room 404. The one or more display devices 418 may, for example, be televisions, monitors, or other devices which include a screen. In particular, the conference intelligence software 410 determines regions of interest within a conference room using the input streams from the one or more video capture devices 400 and using the input streams from the one or more audio capture devices 402. The regions of interest are used to render select content of those input streams within views of a gallery view layout of the conferencing software 408.

In particular, the conference intelligence software 410 includes functionality for determining regions of interest to display within views of a gallery view layout of the conferencing software 408 based on intelligence performed against the input video streams and the input audio streams respectively received from the one or more video capture devices 400 and the one or more audio capture devices 402. For example, the conference intelligence software 410 can include functionality for processing an input video stream and an input audio stream to detect one or more conference participants physically located within the conference room 404 and directions of audio captured within the conference room 404. The conference intelligence software 410 can then determine regions of interest in which to focus output video rendered within views of the conferencing software 408, such as based on a conversational context determined based on the directions of audio and locations of the one or more conference participants within the conference room 404.

The conference intelligence software 410 further includes functionality for outputting multiple output video streams for rendering within different views of a gallery view layout of the conferencing software 408 from a single input video stream received from a video capture device 400. For example, the conference intelligence software 410 can include functionality for determining multiple regions of interest within a field of view of a single video capture device 400 and initializing output video streams for rendering within the conferencing software 408 for each of those regions of interest. Those output video streams can then be transmitted to one or more client devices, for example, the client device 414, at which the regions of interest are rendered within respective, separate views within the conferencing software 408. In some implementations, the conference intelligence software 410 may be implemented at each of the clients which connect to the conferencing software 408 to participant in a conference implemented thereby. For example, the conference intelligence software 410 may be implemented at the client device 412 instead of at the server device 406. In another example, the conference intelligence software 410 may also be implemented at a client device within the conference room 404, such as a computer or other client to which, the one or more video capture devices 400, the one or more audio capture devices 402, and the one or more display devices are coupled. Accordingly, the implementations of this disclosure may operate the conference intelligence software 410 at the server-side or at the client-side. For example, a client-side implementation of the conference intelligence software 410 may process information to be sent to the conferencing software 408 at the client before it is sent to the conferencing software 408 and it may further process information received from the conferencing software 408 before that information is rendered using a client application, such as the client application 416.

Implementations of the conference intelligence software 410 can combine the functionalities described above. For example, an input video stream received from a video capture device 400 and an input audio stream received from an audio capture device 402 can be processed to determine multiple regions of interest within a field of view of the video capture device 400. Multiple output video streams each corresponding to one of those multiple regions of interest may then be initialized or otherwise produced and eventually used to render those different regions of interest within different views of a gallery view layout of the conferencing software 408. In this way, the single input video stream is used to determine multiple output video streams for rendering, such as at the client device 414, and the regions of interest can be intelligently determined based on video, audio, and context.

Figure 5:
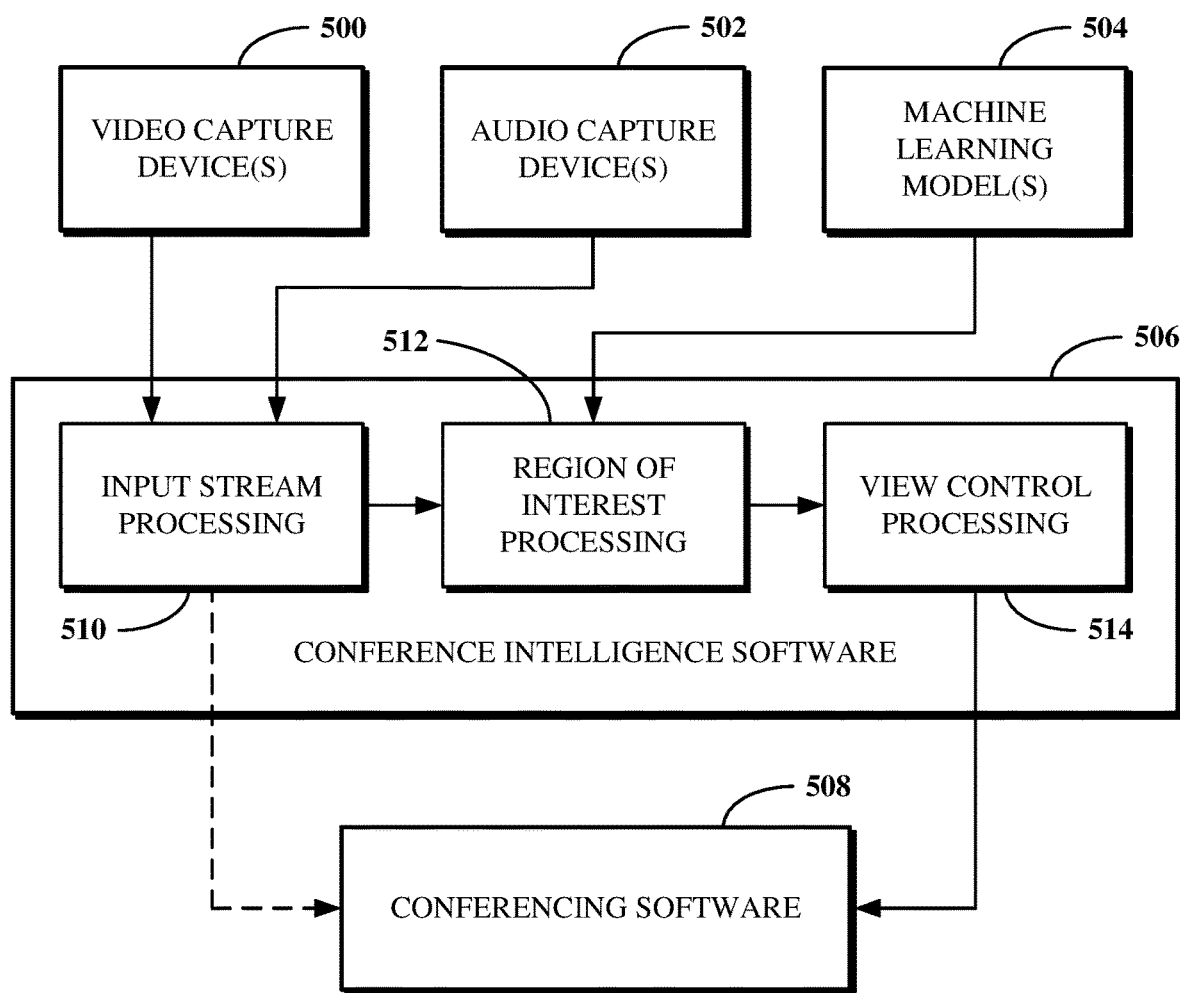
FIG. 5 is a block diagram of an example of a conference gallery view intelligence system.

FIG. 5 is a block diagram of an example of a conference gallery view intelligence system. The conference gallery view intelligence system includes one or more video capture devices 500, one or more audio capture devices 502, one or more machine learning models 504, conference intelligence software 506, and conferencing software 508. The one or more video capture devices 500, the one or more audio capture devices 502, the conference intelligence software 506, and the conferencing software 508 may, for example, respectively be the one or more video capture devices 400, the one or more audio capture devices 402, the conference intelligence software 410, and the conferencing software 408 shown in FIG. 4.

In some cases, the conference intelligence software 506 and the conferencing software 508 are implemented using servers, for example, servers at the datacenter 106 shown in FIG. 1. For example, a single server may implement both of the conference intelligence software 506 and the conferencing software 508. In another example, a first server may implement the conference intelligence software 506 and a second server may implement the conferencing software 508. In yet another example, multiple servers may be used to implement one or both of the conference intelligence software 506 or the conferencing software 508. In other cases, the conferencing software 508 is implemented using one or more servers and the conference intelligence software 506 is implemented at each of the clients which connect to the conferencing software 508 to participate in a conference, for example, the client device 412 shown in FIG. 4.

The conference intelligence software 506 includes software tools for implementing the functionality thereof. In the example shown, the conference intelligence software 506 includes an input stream processing tool 510, a region of interest processing tool 512, and a view control processing tool 514. The input stream processing tool 510 processes input video streams and input audio streams received respectively from the one or more video capture devices 500 and the one or more audio capture devices 502, such as by compressing, decompressing, transcoding, or the like. For example, the input video streams and the input audio streams may be encoded bitstreams when they are received at the conference intelligence software 506. The input stream processing tool 510 can decode the input video streams using a video codec and can decode the audio streams using an audio codec to prepare those streams for further processing.

In some implementations, the input stream processing tool 510 may be part of the conferencing software 508 instead of the conference intelligence software 506. In some implementations, the processed input video streams and the processed input audio streams may be transmitted directly to the conferencing software 508 for display during a conference implemented by the conferencing software 508, thereby omitting operations otherwise performed at the region of interest processing tool 512 and the view control processing tool 514. In some implementations, the input stream processing tool 510 may be omitted.

The region of interest processing tool 512 uses the one or more machine learning models 504 to process the output of the input stream processing tool 510 to determine one or more regions of interest within the conference room in which the one or more video capture devices 500 and the one or more audio capture devices 502 are located. In particular, the region of interest processing tool 512 processes the input video streams and input audio streams processed by the input stream processing tool 510 or otherwise received from the one or more video capture devices 500 and the one or more audio capture devices 502 using the one or more machine learning models 504 to detect one or more conference participants in a conference room based on an input video stream, determine a direction of audio from the one or more conference participants based on an input audio stream, determine a conversational context within the conference room based on the direction of the audio and locations of the one or more conference participants in the conference room, and determine a region of interest to output within the conferencing software 508 based on the conversational context. The region of interest processing tool 512 may further process the input video stream to produce at least two output video streams each corresponding to a different region of interest determined using the region of interest processing tool 512.

The one or more machine learning models 504 may each be or include one or more of a neural network (e.g., a convolutional neural network, recurrent neural network, or other neural network), decision tree, vector machine, Bayesian network, genetic algorithm, deep learning system separate from a neural network, or other machine learning model. The one or more machine learning model 504 each applies intelligence to identify complex patterns in the input and to leverage those patterns to produce output and refine systemic understanding of how to process the input to produce the output. The one or more machine learning model 504 are each trained using one or more training data samples based on the particular use of the respective model. For example, the training data samples may be, include, or otherwise refer to sets of video data, sets of audio data, or sets of conversational context data. In some cases, the training data samples may be pairs of data in which one datum of a given pair represents a video, an audio, or a conversational context input processed at the conference intelligence software 506 and the other datum represents a video, an audio, or a conversational context output from the conference intelligence software 506, such as to indicate how individual pieces of data were ultimately processed and output by the conference intelligence software 506.

The view control processing tool 514 processes the output of the region of interest processing tool 512 to determine views of a gallery view layout of the conferencing software 508 within which to display ones of the regions of interest and to produce output video streams to be rendered within those views of the conferencing software 508. An output video stream includes video data which can be processed (e.g., decoded or the like) at a client device, for example, the client device 412 shown in FIG. 4, to render a region of interest associated with the output video stream within a view of the gallery view layout of the conferencing software 508. The gallery view layout is an arrangement of views displayed during a conference implemented using the conferencing software 508. A view of the gallery view layout or otherwise of the conferencing software 508 refers to a typically rectangular region of a software graphical user interface dedicated for displaying video associated with one or more conference participants, regardless of whether those conference participants are physically located in the conference room.

There may be one or more kinds of views within which various output video streams may be rendered for display within the conferencing software. For example, a gallery view layout may include one or more primary views which display regions of interest each associated with one or more conference participants who are primary speakers of the conference, such as persons who are leading a group discussion or are presenting on a topic. In another example, a gallery view layout may include one or more secondary views which display regions of interest each associated with one or more conference participants who are participating in a group conversation in some way but who may not be considered to be singly leading the group conversation. In yet another example, a gallery view layout may include one or more tertiary views which display regions of interest each associated with one or more conference participants randomly selected for spotlighting at some point in time during the conference.

The gallery view layout includes a fixed number of views, but the content within one or more of those views may in some cases change at one or more times during the conference. For example, based on changes in the video data, the audio data, or both of the input video streams and the input audio streams received from the one or more video capture devices 500 and the one or more audio capture devices 502, the region of interest processing tool 512 may determine that the regions of interest which are currently being displayed within a view of the gallery view layout of the conferencing software 508 should change, for example, based on determining a change in the conversational context within the conference room. In such a case, a new region of interest may be determined and output for display within that view.

The views may be arranged based on a type of the conference implemented by the conferencing software 508. For example, the type of the conference may be a presentation, a group discussion, or another conference type. In one example, the views may be arranged with a single primary view and one or two secondary views during a presentation. In another example, the views may be arranged with multiple secondary views and zero primary views during a group discussion. The type of the conference may be identified by a host of the conference or by another operator of the conferencing software 608, such as when the conference is scheduled or started. Alternatively, the type of the conference may be intelligently identified during a conference based on the conversational contexts determined using the input video streams and the input audio streams. In some implementations, the operator of a client device at which the views are displayed can select the gallery view layout and/or the arrangement of views therein.

The output of the view control processing tool 514 is then transmitted to the conferencing software 508. In particular, the output from the view control processing tool 514, and thus from the conference intelligence software 506, includes regions of interest for display within specified views or view types of the conferencing software 508. For example, the output from the view control processing tool 514, and thus from the conference intelligence software 506, can be output data streams representative of those regions of interest and which can be rendered within the specified views of the conferencing software 508 to cause those regions of interest to be displayed at one or more client devices connected to the conference implemented using the conferencing software 508.

Figure 6:
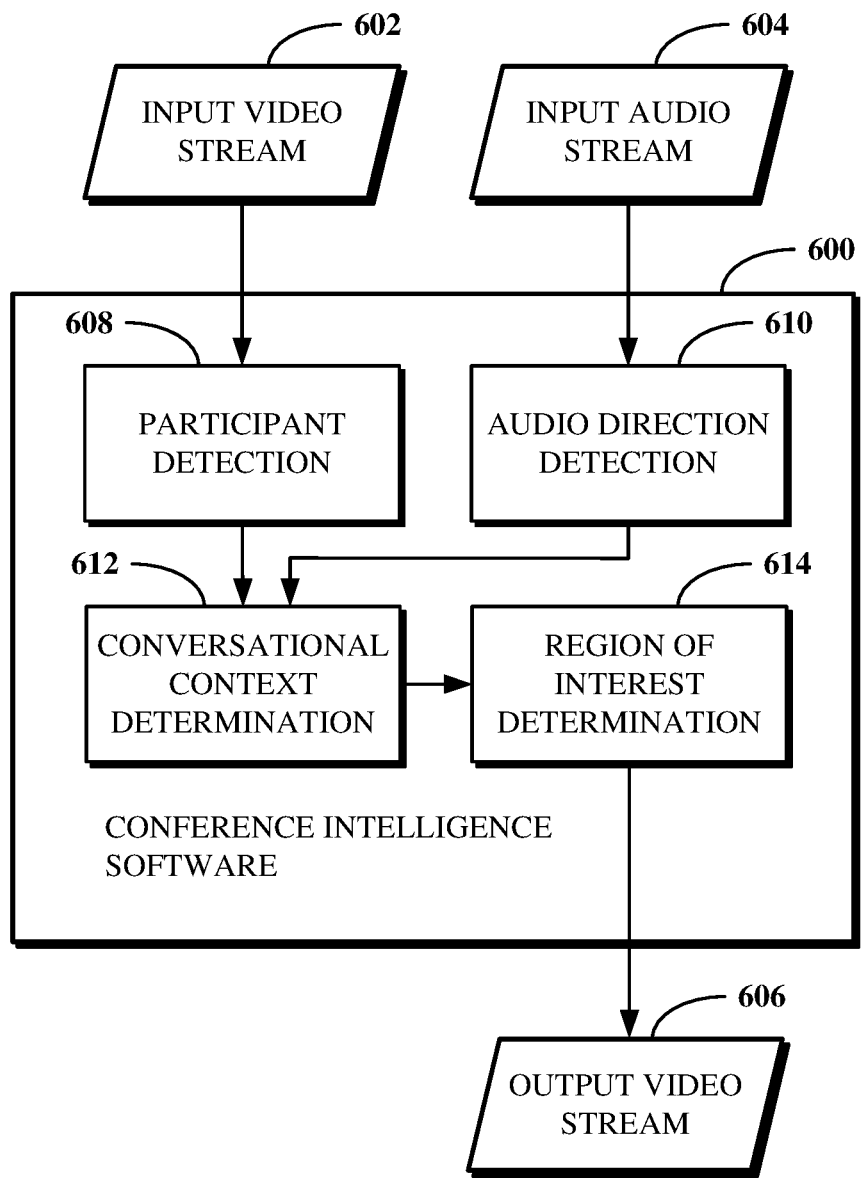
FIG. 6 is a block diagram of an example of a system for determining regions of interest within a field of view of a video capture device.

FIG. 6 is a block diagram of an example of a system for determining regions of interest within a field of view of a video capture device. As shown, conference intelligence software 600, which may, for example, be the conference intelligence software 506 shown in FIG. 5, receives as input an input video stream 602 and an input audio stream 604 and outputs an output video stream 606. The input video stream 602 is received from a video capture device, which may, for example, be the video capture device 500 shown in FIG. 5, and the input audio stream 604 is received from an audio capture device, which may, for example, be the audio capture device 502 shown in FIG. 5. The output video stream 606 includes video data which may be rendered using conferencing software (e.g., the conferencing software 508 shown in FIG. 5) to display a region of interest determined using the conference intelligence software 600.

The conference intelligence software 600 includes software for determining regions of interest within a field of view of a video capture device. As shown, the conference intelligence software 600 includes a participant detection tool 608, an audio direction detection tool 610, a conversational context determination tool 612, and a region of interest determination tool 614. One or more of the software tools 608 through 612 may, for example, be implemented by the region of interest processing tool 512 shown in FIG. 5. The below discussion of the tools 608 through 614 reference machine learning models, which may, for example, be the one or more machine learning models 504 shown in FIG. 5.

The conference intelligence software 600 is described herein as processing a single input video stream 602 and a single input audio stream 604 to determine a single output video stream 606; however, the functionality described herein with respect to the conference intelligence software 600 is in practice performed to determine multiple regions of interest and thus to produce multiple output video streams, such as based on a single input video stream and a single input audio stream or otherwise based on multiple input video streams and/or multiple input audio streams.

The participant detection tool 608 processes the input video stream 602 to detect a number of people, as conference participants, within the field of view of the video capture device from which the input video stream 602 is received, as well as the locations of those conference participants within the conference room in which the video capture device is located. The participant detection tool 608 can use a machine learning model trained for object detection, facial recognition, or other segmentation to identify humans within the video data of the input video stream 602. For example, the machine learning model can draw bounding boxes around objects detected as having human faces, in which those objects are recognized as the conference participants and remaining video data is representative of background content. The locations of the conference participants may thereafter be determined based on a relationship in space between the video capture device and each of those bounding boxes as determined, for example, using a machine learning model trained for depth estimation or a similar tool.

The audio direction detection tool 610 performs direction of arrival processing against the audio data of the input audio stream 604 to determine the directions from which the audio data of the input audio stream 604 arrive at the audio capture device from which the input audio stream 604 is received. For example, the audio direction detection tool 610 may first use a machine learning model trained for voice activity detection or a similar tool to detect when the audio data includes human vocal sounds, such as from a person talking. The audio direction detection tool 610, upon detecting voice activity within the audio data of the input audio stream 604, thereafter processes that audio data using a machine learning model trained for direction of arrival processing or a similar tool to determine where the voice activity is coming from within the conference room. The direction of arrival processing may include using one or more direction of arrival estimation techniques.

The conversational context determination tool 612 processes the directions of arrival determined by the audio direction detection tool 610 and the locations of the conference participants determined by the participant detection tool 608 to determine a conversational context within the conference room, and, more specifically, within the field of view of the video capture device from which the input video stream 602 is received. The conversational context determination tool 612 uses a machine learning model trained for conversational context analysis or a similar tool to determine context and related information for a conversation within the field of view of the video capture device. For example, where three conference participants are detected within the conference room and directions of arrival indicate that not only is a first one of those conference participants talking for some period of time, but that he or she has been talking to a second one of those conference participants for a recent portion of that period of time (e.g., the past minute), the conversational context determination tool 612, using a machine learning model which processes the various inputs described herein, can determine that the conversational context within the field of view of the video capture device is a dialogue between the first and second conference participants. In another example, where only a single conference participant has been talking for a relatively long period of time (e.g., more than a couple minutes), the conversational context determination tool 612, using the machine learning model which processes the various inputs described herein, can determine that the conversational context within the field of view of the video capture device is a presentation, such as a lecture or another engagement in which a single person is speaking for most of a conference. Other examples of conversational context may include a group discussion, a set of separate dialogues within the same space, or the like. The machine learning model used by the conversational context determination tool 612 can process the directions of arrival determined by the audio direction detection tool 610 and the locations of the conference participants determined by the participant detection tool 608 based on a length of time that each respective conference participant has been speaking. For example, where only a first conference participant has been speaking for five minutes, the machine learning model may process the various inputs to determine that the conversational context is a presentation. In another example, where a first conference participant has been speaking with a second conference participant, the machine learning model may process the various inputs to determine that the conversational context is a group discussion or other dialogue.

The region of interest determination tool 614 determines a region of interest within the field of view of the video capture device to feature within a view of the conferencing software based on the conversational context determined by the conversational context determination tool 612. In particular, the region of interest determination tool 614 uses the determined conversational context to understand which portions of video data within the field of view of the video capture device are relevant to the conversation, such as by using the conversational context to understand which of the conference participants is actively participating in the conversation. The region of interest determination tool 614 processes the conversational context using a machine learning model trained for region of interest determination or a similar tool to determine the portions of the video data to feature in a region of interest. In this way, the machine learning model may operate as a de factor movie director to choose which conference participants are framed in a shot, to be output for display within a view of the conferencing software, based on the conversational context in the conference room. In some implementations, the region of interest determination tool 614 may select to use a default region of interest covering most or all of a field of view of the video capture device where the conversational context is unclear, such as where most or all of the conference participants are loudly speaking in the conference room and it is unclear from the outputs of the participant detection tool 608 and the audio direction detection tool 610 who is speaking.

In some implementations, the region of interest determined by the region of interest determination tool 614 may be a zoomed in version of a portion of the field of view of the video capture device associated with the determined conversational context. For example, based on the conversational context, the machine learning model trained for region of interest determination may determine to zoom into a portion of the field of view to focus more closely on one or more of the conference participants. For example, where the conversational context is a presentation, the region of interest determination tool 614 may zoom into a portion of the field of view of the video capture device which includes video data representative of the presenters face. In some such implementations, the region of interest determination tool 614 may change zoom parameters for a given region of interest during a conference, such as based on conversational context, random selection, or other criteria. In some such implementations, the region of interest determination tool 614 may select to use a default zoom parameter where the conversational context is unclear, such as where most or all of the conference participants are loudly speaking in the conference room and it is unclear from the outputs of the participant detection tool 608 and the audio direction detection tool 610 who is speaking.

In some implementations, the conference intelligence software 600 may control a movement of the video capture device to cause a change to the field of view thereof. For example, where directions of arrival tend to suggest that the detected voice activity is coming from a conference participant who is not in a field of view of the video capture device or is partially occluded within the field of view, the conference intelligence software 600 can transmit a signal configured to cause a mechanical or electronic controller of the video capture device to reposition the video capture device in some way, such as by a change of pan, tilt, and/or zoom.

In some implementations, the conversational context determination tool 612 can be omitted. For example, the region of interest determination tool 614 can determine a region of interest to use to produce the output video stream 606 based on the directions of arrival of voice activity detected within the input audio stream 604 and the locations of the conference participants within the conference room. For example, a region of interest within the field of view of the video capture device can be determined by aligning the directions of arrival of the detected voice activity with the locations of the conference participants within the conference room, such as to detect the conference participants from whom the voice activity was detected.

In some cases, the gallery view layout may have a number of views which is larger than a number of conference participants. In such a case, the region of interest determination tool 614 can determine to split a region of interest determined for a first view into a first view and a second view so as to divide the conference participants within that first view amongst the two views. Alternatively, the region of interest determination tool 614 may determine to output for display a region of interest which includes the entire field of view of the image capture device from which the input video stream is received.

Figure 7:
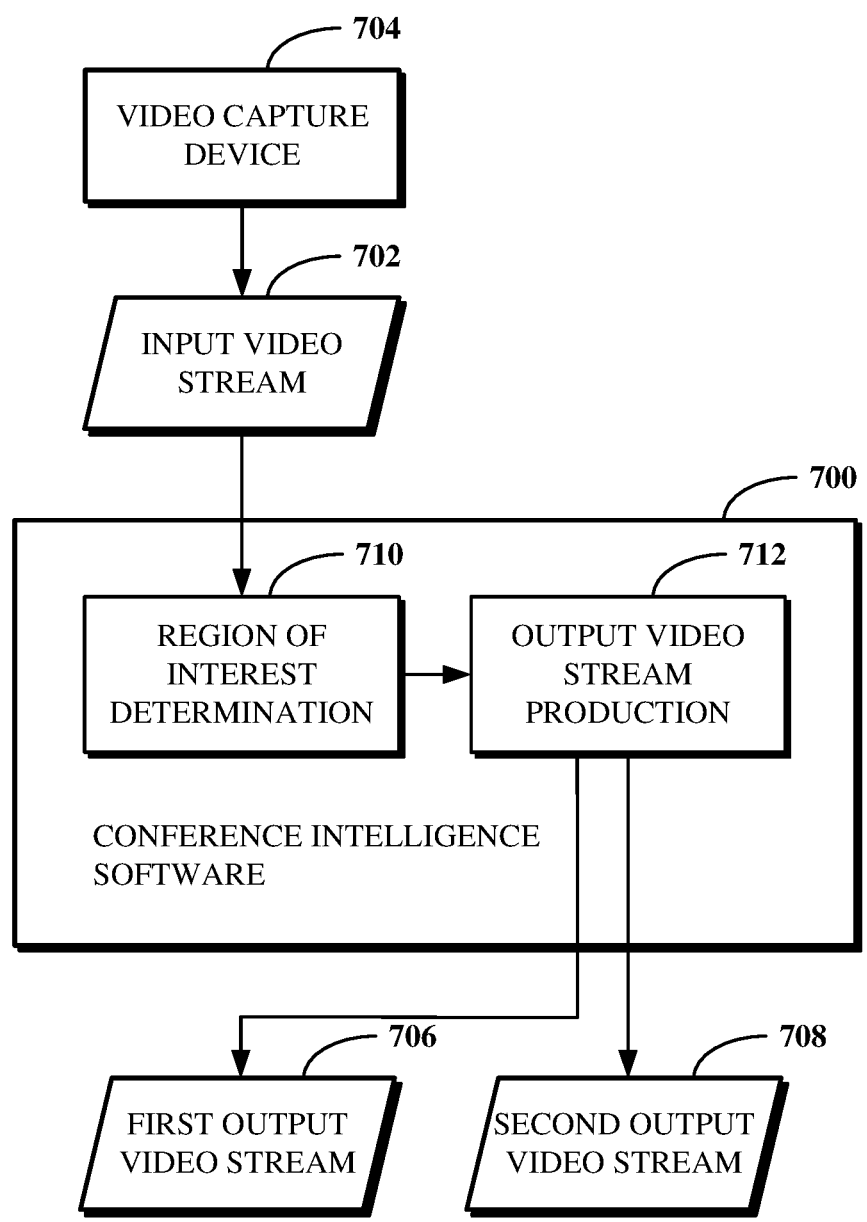
FIG. 7 is a block diagram of an example of a system for rendering output video streams based on an input video stream from a video capture device.

FIG. 7 is a block diagram of an example of a system for rendering output video streams based on an input video stream from a video capture device. As shown, conference intelligence software 700, which may, for example, be the conference intelligence software 506 shown in FIG. 5 and/or the conference intelligence software 600 shown in FIG. 6, receives as input an input video stream 702 from a video capture device 704, which may, for example, be the video capture device 500 shown in FIG. 5, and outputs multiple output video streams, including a first output video stream 706 and a second output video stream 708. The first output video stream 706 includes video data which may be rendered using conferencing software (e.g., the conferencing software 508 shown in FIG. 5) to display a first region of interest determined using the conference intelligence software 700 within a first view of a gallery view layout of the conferencing software. The second output video stream 708 includes video data which may be rendered using the conferencing software to display a second region of interest determined using the conference intelligence software 700 within a second view of a gallery view layout of the conferencing software.

The conference intelligence software 700 includes a region of interest determination tool 710 and an output video stream production tool 712. The region of interest determination tool 710 may, for example, be the region of interest determination tool 614 shown in FIG. 6 or otherwise perform functionality similar to that of the region of interest determination tool 614. The output video stream production tool 712 produces multiple output video streams based on a single input video stream, namely, the input video stream 702, such that each of the multiple output video streams corresponds to a different region of interest determined by the region of interest determination tool 710. For example, when determining a conversational context based on directions of audio and locations of conference participants within a conference room, a determination can be made that the video data represents multiple regions of interest.

For example, where the conversational context indicates that the conversation in the conference room is a group discussion and the field of view of the video capture device 704 covers a portion of a conference room which includes a first conference participant at one end of the conference room and a second conference participant at another end of the conference room in which those first and second conference participants are actively participating in the group discussion, a first region of interest may be determined for the first participant and a second region of interest may be determined for the second participant, such as to represent those participants within their own views in the gallery view layout of the conferencing software. Accordingly, the first output video stream 706 may be produced for the view with the first conference participant and the second output video stream 708 may be produced with the view with the second conference participant.

In another example, where the conversational context indicates that the conversation in the conference room is a presentation and the field of view of the video capture device 704 covers a portion of a conference room which includes a first conference participant who is leading the presentation at one end of the conference room and one or more second conference participants at another end of the conference room who are listening to the presentation, a first region of interest may be determined for the first participant and a second region of interest may be determined for the one or more second conference participants, such as to represent the first participant in a first view and the one or more second participants within a second view in the gallery view layout of the conferencing software. Accordingly, the first output video stream 706 may be produced for the view with the first conference participant and the second output video stream 708 may be produced with the view with the one or more second conference participants.

Figure 8A:
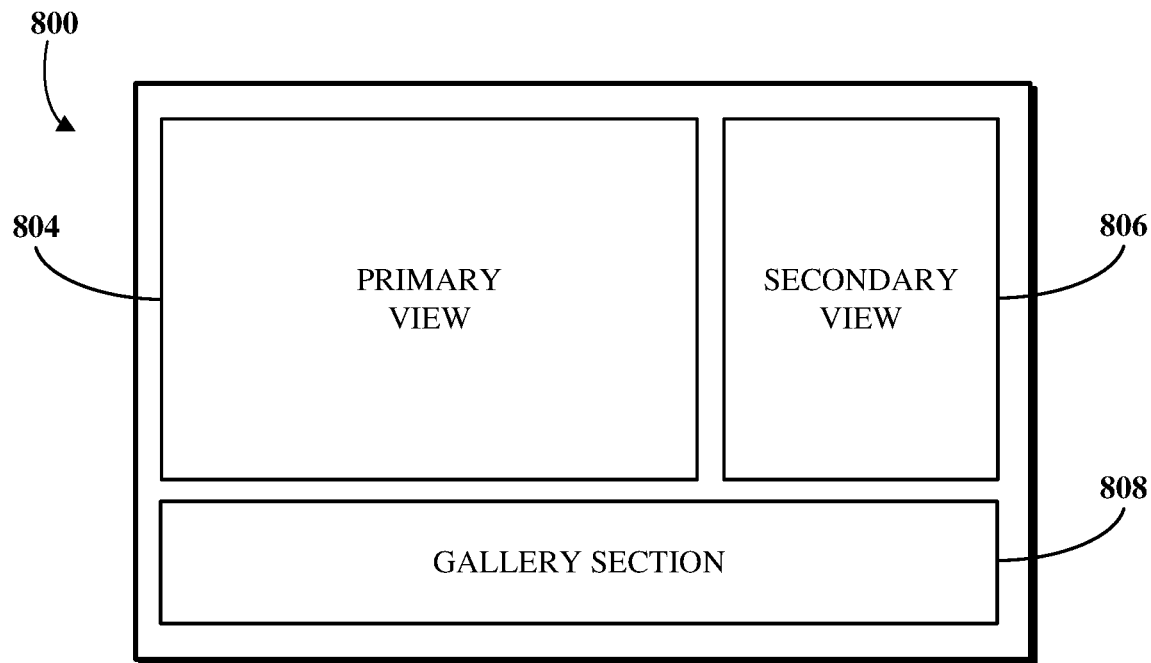
FIGS. 8A-B are illustrations of examples of gallery view layouts populated using a conference gallery view intelligence system.
Figure 8B:
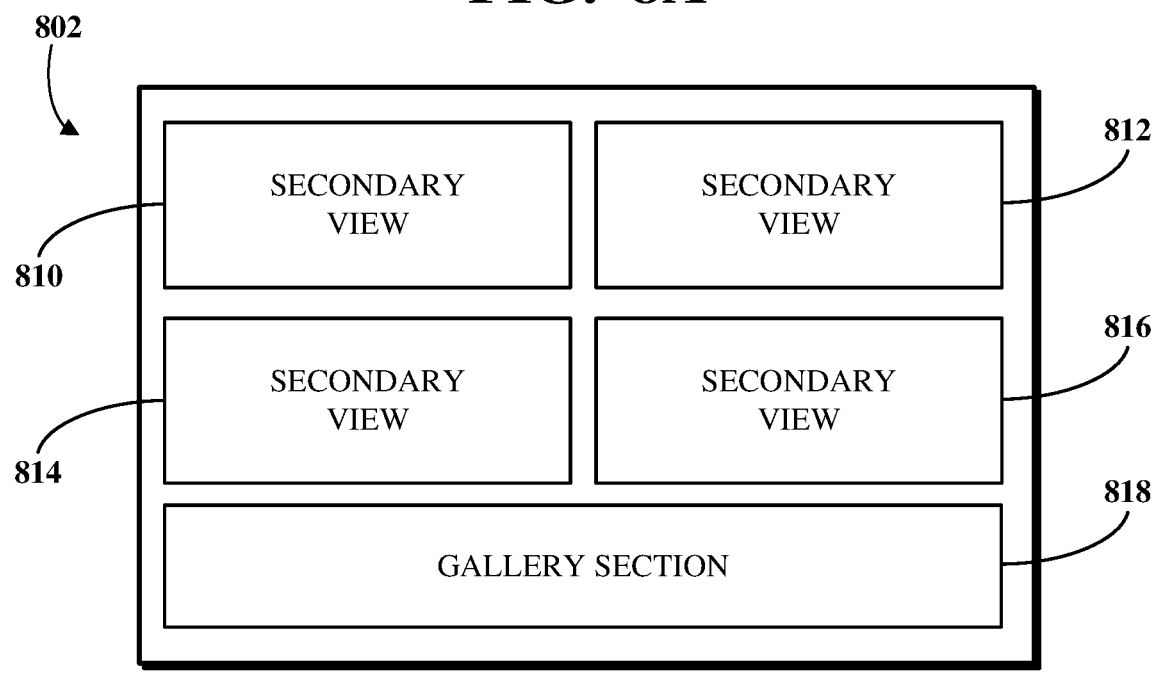

FIGS. 8A-B are illustrations of examples of gallery view layouts 800 and 802 populated using a conference gallery view intelligence system. The gallery view layouts 800 802 are gallery view layouts including one or more views and which are output for display at one or more client devices, such as the client device 412 shown in FIG. 4, by conferencing software, which may, for example, be the conferencing software 408 shown in FIG. 4. A different output video stream is rendered within each of the one or more views of a gallery view layout.

Referring first to FIG. 8A, the gallery view layout 800 includes a primary view 804, a secondary view 806, and a gallery section 808. The gallery view layout 800 may represent a layout of views for presentations or conferences in which one participant or a group of participants within a field of view of a video capture device are leading a conversation within a conference room in which the video capture device is located. For example, the primary view 804 is a largest view of the gallery view layout 800 and may be used to render an output video stream determined based on a region of interest which includes the presenter or other conversation leader or leaders. The secondary view 806 may rotate through other regions of interest to show other conference participants. For example, the secondary view 806 can render an output video stream based on a region of interest in which one or more conference participants are located and watching the presentation or other conversation. In another example, the secondary view 806 can render an output video stream based on a region of interest in which a conference participant is asking a question to be answered by the presenter or other conversation leader or leaders. The gallery section 808 can include one or more smaller views rendering output video streams received from client devices connected to the conferencing software, such as of conference participants not located in the conference room.

Referring next to FIG. 8B, the gallery view layout 802 includes secondary views 810, 812, 814, and 816 and a gallery section 818. The gallery view layout 802 may represent a layout of views for group discussions in which no one conference participant or group thereof is considered the main presenter or conversation leader. For example, the secondary views 810 through 816 may each render output video streams of different regions of interest showing conference participants who are actively participating (e.g., talking) in a discussion and/or who are listening to the conversation without actively participating. For example, the secondary views 810 and 812 may show content of conference participants who are talking about a topic while the secondary views 814 and 816 may show content of conference participants who are listening to those other conference participants talk. The gallery section 818 can include one or more smaller views rendering output video streams received from client devices connected to the conferencing software, such as of conference participants not located in the conference room.

The gallery view layouts 800 and 802 are two examples of gallery view layouts which may be used in a conference gallery view intelligence system as disclosed herein. Thus, other examples of gallery view layouts in accordance with the implementations of this disclosure include gallery view layouts with multiple primary views, without secondary views, with one or more tertiary views, with multiple gallery sections, without a gallery section, or the like, or a combination thereof.

Figure 9:
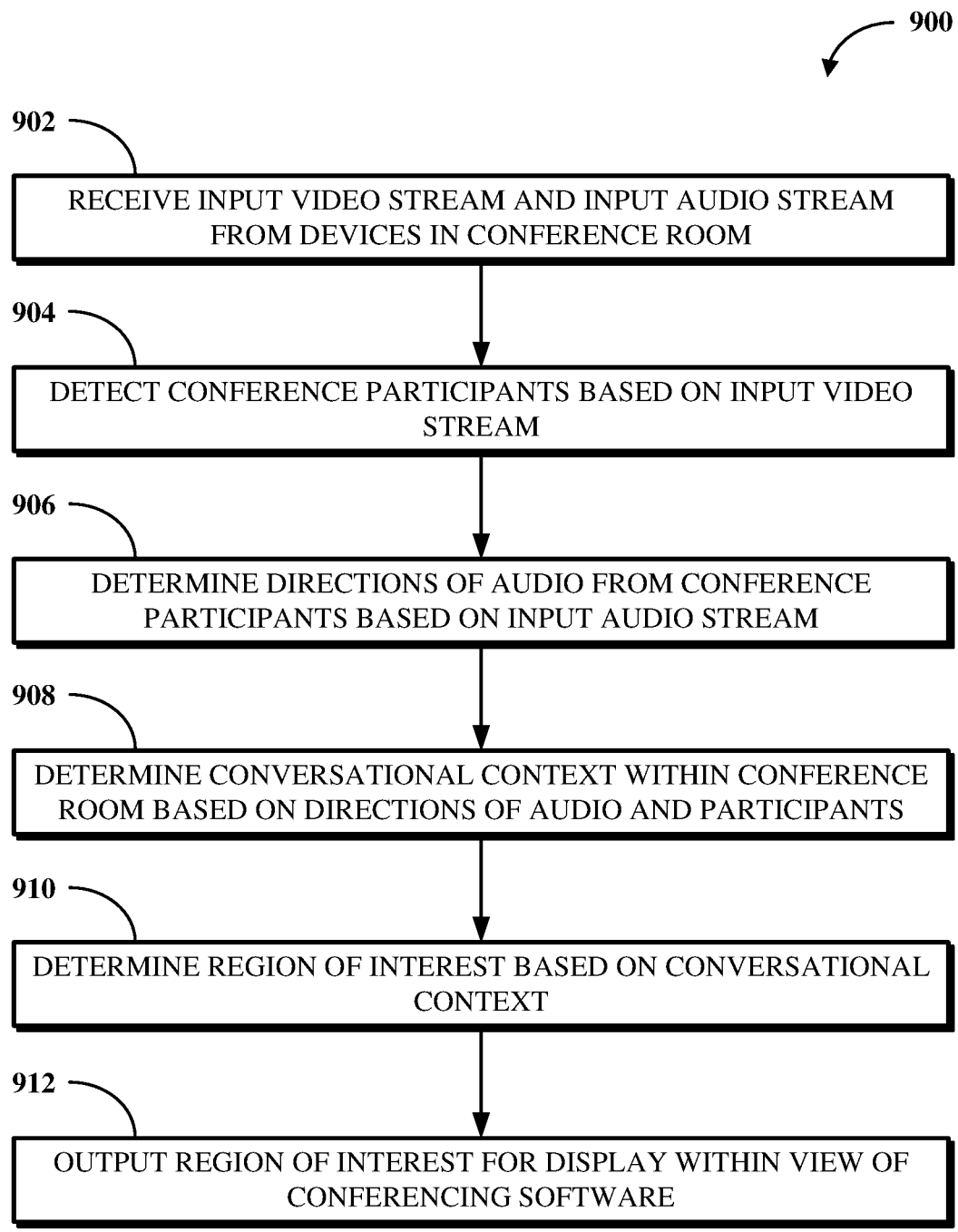
FIG. 9 is a flowchart of an example of a technique for determining regions of interest within a field of view of a video capture device.
Figure 10:
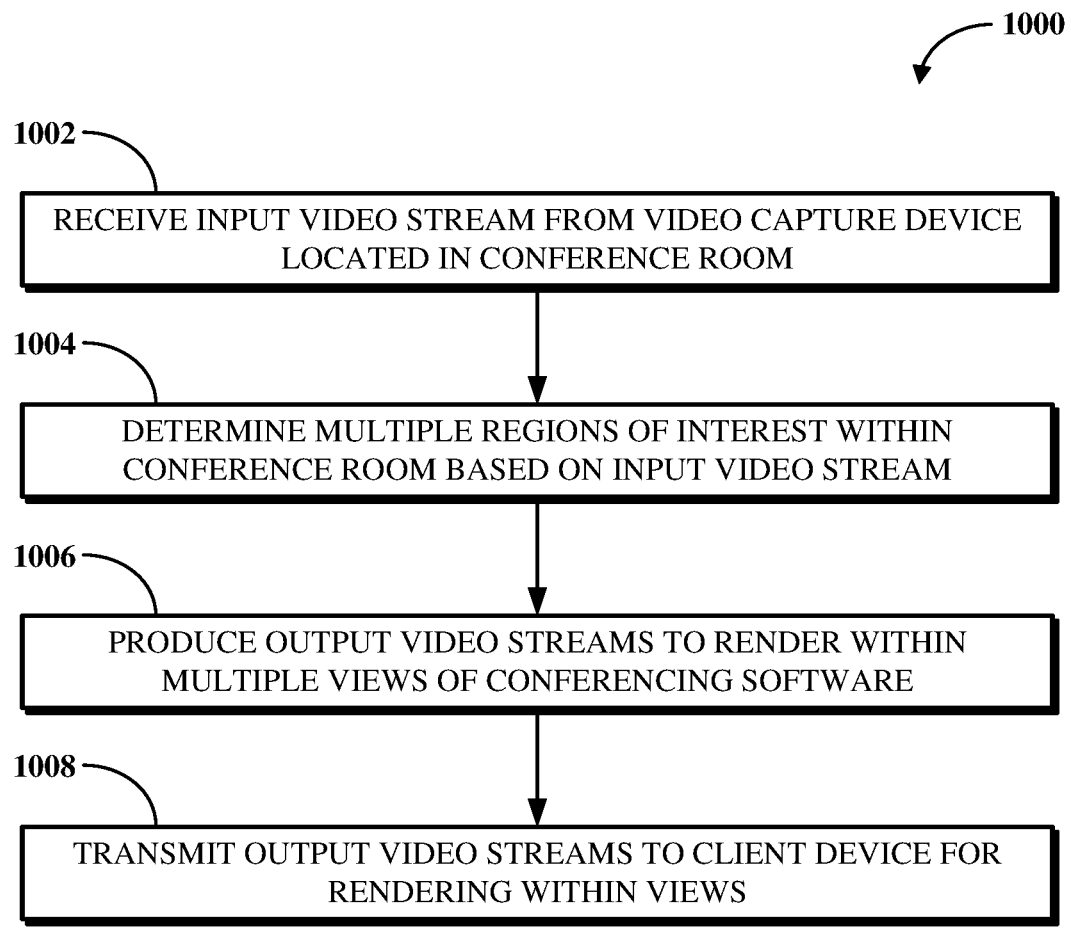
FIG. 10 is a flowchart of an example of a technique for rendering output video streams based on an input video stream from a video capture device.

To further describe some implementations in greater detail, reference is next made to examples of techniques which may be performed by or using a conference gallery view intelligence system. FIG. 9 is a flowchart of an example of a technique 900 for determining regions of interest within a field of view of a video capture device. FIG. 10 is a flowchart of an example of a technique 1000 for rendering output video streams based on an input video stream from a video capture device.

The technique 900 and/or the technique 1000 can be executed using computing devices, such as the systems, hardware, and software described with respect to FIGS. 1-8. The technique 900 and/or the technique 1000 can be performed, for example, by executing a machine-readable program or other computer-executable instructions, such as routines, instructions, programs, or other code. The steps, or operations, of the technique 900 and/or the technique 1000, or of another technique, method, process, or algorithm described in connection with the implementations disclosed herein, can be implemented directly in hardware, firmware, software executed by hardware, circuitry, or a combination thereof.

For simplicity of explanation, the technique 900 and the technique 1000 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 9, the technique 900 for determining regions of interest within a field of view of a video capture device is shown. At 902, an input video stream and an input audio stream are received from devices located within a conference room. The input video stream includes video data captured at a video capture device, such as a camera, within the conference room. The input audio stream includes audio data captured at an audio capture device, such as a microphone array, within the conference room.

At 904, one or more conference participants are detected based on the input video stream. The one or more conference participants are humans physically located within the conference room. Detecting the one or more conference participants based on the input video stream includes processing the video data of the input video stream to identify one or more humans, such as using facial detection, and then segmenting the one or more humans from a background identified within the video data. The background may, for example, represent video data which does not correspond to the identified humans. The conference participant detection may be performed using a machine learning model trained for facial detection and foreground/background segmentation of image and/or video data.

At 906, directions of audio from the one or more conference participants are determined based on the input audio stream. Determining a direction of audio from the one or more conference participants based on the input audio stream includes processing audio data of the input audio stream to detect voice activity therein and to then determine a direction from which the voice activity arrived at the audio capture device. The direction of audio is thus a direction of arrival of voice activity detected within the audio data of the input audio stream. For example, the input audio stream may include audio data corresponding to voice activity and audio data corresponding to other sounds, such as background or ambient noise. The direction of audio determination may be performed using a machine learning model trained for direction of arrival processing of audio data.

At 908, a conversational context is determined within the conference room based on the directions of audio and locations of the one or more conference participants within the conference room. The conversational context corresponds to a context and length of a conversation within the conference room. The conversation may be a presentation lead by one of the conference participants, a dialogue between two or more of the conference participants, or another conversation involving one or more of the conference participants physically located within the conference room. The conversational context may be determined using a machine learning model trained to determine regions of interest using conversational dynamic processing, such as based on recordings of past conferences.

At 910, a region of interest within the conference room is determined based on the conversational context. The region of interest is some region within a field of view of the video capture device from which the input video stream is received and which includes the one or more conference participants who are part of the conversational context. For example, where the field of view of the video capture device includes four conference participants and a conversational context determined based on the determined directions of audio and the locations of the detected conference participants indicates that two of those four conference participants are actively participating in a conversation, the region of interest may correspond to only that portion within the field of view of the video capture device in which those two conference participants are located within the conference room.

At 912, the region of interest is output for display within a view of conferencing software. Outputting the region of interest for display within the view of the conferencing software includes transmitting an output video stream representative of the region of interest for rendering at one or more client devices and/or rendering an output video stream representative of the region of interest at one or more client devices. The conferencing software includes a gallery view layout which represents an arrangement of one or more views within a gallery of participants displayed within the conferencing software. Outputting the region of interest for display within the view of the conferencing software may further include determining the view within which to display the region of interest based on the conversational context within the conference room. For example, based on the conversational context, a determination may be made to output the region of interest within a primary view of the gallery view layout, a secondary view of the gallery view layout, or another view of the gallery view layout.

In some implementations, the technique 900 may including outputting a second region of interest for display within a view of the conferencing software. For example, the region of interest described above may be considered a first region of interest within a field of view of the video capture device. In some such implementations, the first region of interest is determined using an input video stream received from a first video capture device having a first field of view within the conference room and the second region of interest is determined using an input video stream received from a second video capture device having a second field of view within the conference room. In some such implementations, a change in the conversational context may be determined, such as based on changes in the video data received within the input video stream and/or based on changes in the audio data received within the input audio stream. For example, the change in the conversational context may refer to a change in a conversation within the conference room in which the one or more conference participants who were previously actively involved in a conversation are no longer the main speakers, and a different one or more of the conference participants are now the active speakers in the conversation. A second region of interest can be determined based on that change in the conversational context.

In some such implementations, a change in conversational context may result in a change in the content output within the view of the conferencing software in which the first region of interest had been output. For example, the second region of interest determined above can be output for display within the same view of the conferencing software to which the first region of interest had been output and the first region of interest may be moved to a different view of the conferencing software. In another example, the second region of interest may replace the first region of interest in the same view of the conferencing software without the first region of interest being moved to a different view. In other such implementations, a change in conversational context may result in the second region of interest being output for display within a different view and the first region of interest may remain displayed within its existing view.

In some implementations, a second region of interest may be determined without a change in the conversational context which lead to the first region of interest being determined. For example, the technique 900 can include detecting the one or more other conference participants in the conference room based on the input video stream, determining a second direction of audio from the one or more other conference participants based on the input audio stream, determining a second conversational context within the conference room based on the second direction of the audio and locations of the one or more other conference participants in the conference room, determining a second region of interest to output within conferencing software based on the conversational context, and determining a second view of the conferencing software within which to display the second region of interest based on the second conversational context.

In some such implementations, determining the region of interest may include determining to output the region of interest for display within the view of the conferencing software based on an evaluation of the conversational context and a second conversational context used to determine a second region of interest. For example, the conversational context associated with a first candidate region of interest to output within a view of the conferencing software can be compared against the conversational context associated with a second candidate region of interest to output within a view of the conferencing software. Comparing the conversational contexts can include using a machine learning model to compare contexts and lengths of respective conversations to determine which context has a greater impact on the conference. For example, the conversational context associated with the first candidate region of interest may be based on a presenter leading a conversation whereas the conversational context associated with the second candidate region of interest may be based on two or more audience members having a side conversation during the conference. In some such implementations, a determination can be made to output the first candidate region of interest as a region of interest within a view such as because the conversational context associated with the first candidate region of interest is considered to be more important to the conference overall.

In some implementations, where there are multiple regions of interest determined and output within different views of the conferencing software, the technique 900 can include determining the types of views within which to output those regions of interest for display based on the conversational contexts used to determine those regions of interest and/or based on other information associated with the conference. For example, when the conversational context indicates that the one or more conference participants includes a presenter, a first view may be a primary view of the gallery view layout and a second view may be a secondary view of the gallery view layout. In another example, when the conversational context indicates a conversation between two or more conference participants of the one or more conference participants and the second conversational context indicates that the one or more other conference participants is listening to the conversation between the two or more conference participants, the first view and the second view may each be secondary views of the gallery view layout.

Referring first to FIG. 10, the technique 1000 for rendering output video streams based on an input video stream from a video capture device is shown. At 1002, an input video stream is received from a video capture device located within a conference room. The input video stream includes video data captured at a video capture device, such as a camera, within the conference room.

At 1004, multiple regions of interest within the conference room are determined based on the input video stream. Each region of interest of the multiple regions of interest corresponds to a different portion of a field of view of the video capture device and thus to a different portion of the input data stream. Determining the multiple regions of interest can include processing the input video stream and an input audio stream as described above with respect to FIG. 9, for example, by detecting conference participants within a field of view of the video capture device, determining directions of arrival for those conference participants, determining conversational contexts based on those directions of arrival and those conference participants, and determining the regions of interest within the field of view of the video capture device based on those conversational contexts. Thus, the multiple regions of interest within the conference room are based on participants located in the conference room, and, more specifically, based on locations of those participants within the conference room.

At 1006, output video streams to render within multiple views of conferencing software are produced. In particular, at least two output video streams are produced from the one input video stream. Each of the output video streams corresponds to one of the regions of interest determined based on the input video stream. In this way, the single input video stream can be used to ultimately output different content within different views of conferencing software. For example, the regions of interest may eventually be represented within separate views of a gallery view layout output for display by the conferencing software. The separate views may, for example, include a first view of the gallery view layout and a second view of the gallery view layout, in which the output video stream corresponding to a first one of the regions of interest includes content rendered within the first view and the output video stream corresponding to a second one of the regions of interest includes content rendered within the second view.

At 1008, the output video streams are transmitted to one or more client devices for rendering within the views of the conferencing software. The output video streams are transmitted over channels opened between a server implementing the conferencing software and the client devices which are connected to the conferencing software. Transmitting the output video streams can include transmitting instructions indicating the views of the gallery view layout of the conferencing software within which to render respective ones of the output video streams. For example, and based on the conversational contexts used to determine the regions of interest within the field of view of the video capture device, instructions can be transmitted along with the output video streams to indicate whether a given output video stream is to be rendered within a primary view, a secondary view, or another view of the conferencing software.

In some implementations, the technique 1000 can include determining regions of interest as described above based on the input video stream received from the video capture device, as a first video capture device, and determining other regions of interest based on a second input video stream received from a second video capture located within the conference room. The second video capture device has a field of view which is different from the field of view of the first video capture device. In some implementations, the fields of view of the two video capture devices may be at least partially overlapping within the conference room. The other regions of interest may be determined based on the second input video stream in the same manner as the regions of interest are determined with respect to the first video capture device. The multiple regions of interest determined using the technique 1000 may thus in at least some implementations include one or more regions within a field of view of the first video capture device and one or more regions within the field of view of the second video capture device.

In some implementations, the technique 1000 can include rendering the output video streams within the respective views of the conferencing software. For example, content of the first output video stream can be rendered within a first view of the conferencing software and content of the second output video stream can be rendered within a second view of the conferencing software.

In some implementations, the regions of interest may be determined at a first time during the conference, and the technique 1000 can include determining at least one different region of interest within the field of view based on changes within a conference room in which the video capture device is located and modifying an output video stream according to the at least one different region of interest to change the content rendered within at least one view of the gallery view layout. For example, the changes correspond to conversational dynamics determined using a machine learning model. The changes may thus represent changes in a conversation occurring within the conference room during the conference, in which a region of interest changes from a first location within the conference room to a second location within then conference room to include different conference participants or otherwise zooms in or out from the current location within the conference room to include different conference participants. In some such implementations, the field of view of the video capture device may be adjustable to determine different regions of interest within the conference room.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    detecting, by a computing device, conference participants in a conference room based on an input video stream received from a video capture device located within the conference room;
    determining, by the computing device, a direction of audio associated with conference participants based on an input audio stream received from a multi-directional audio capture device located within the conference room;
    determining, by the computing device, a conversational context within the conference room based on the direction of the audio and locations of the conference participants in the conference room;
    determining, by the computing device and within a field of view of the video capture device, a first region of interest to output within a first view of conferencing software based on the conversational context, wherein the first region of interest is associated with one or more first conference participants of the conference participants;
    determining, by the computing device and within the field of view of the video capture device, other regions of interest available for outputting within a second view of the conferencing software based on the conversational context, wherein the other regions of interest are associated with one or more second conference participants of the conference participants;
    outputting, by the computing device and based on the conversational context, the first region of interest for display within the first view; and
    changing, by the computing device and based on the conversational context, between ones of the other regions of interest output for display within the second view while the first region of interest is output within the first view.

2. The method of claim 1, the method comprising:
    determining a change in the conversational context;
    determining a second region of interest to output within the first view based on the change in the conversational context; and
    outputting the second region of interest for display within the first view.

3. The method of claim 2, wherein the first region of interest is output for display within the second view when the second region of interest is output for display within the first view.

4. The method of claim 1, wherein the conversational context corresponds to a context and length of a conversation between a first participant and a second participant of the one or more conference participants, and wherein the first region of interest is determined using a machine learning model.

5. The method of claim 4, wherein the machine learning model is trained to determine regions of interest using conversational dynamic processing based on recordings of past conferences.

6. The method of claim 1, wherein the first view and the second view are views of a plurality of views within a gallery view layout of the conferencing software, and wherein outputting the first region of interest for display within the first view comprises:
determining a type of the first view based on the conversational context within the conference room.

7. The method of claim 6, wherein the conversational context is a first conversational context, wherein one or more other conference participants and the conference participants are located in different places within a field of view of the video capture device, and wherein the method comprises:
detecting the one or more other conference participants in the conference room based on the input video stream;
determining a second direction of audio from the one or more other conference participants based on the input audio stream;
determining a second conversational context within the conference room based on the second direction of the audio and locations of the one or more other conference participants in the conference room;
determining a second region of interest to output within the second view based on the second conversational context; and
determining to output the second region of interest for display within the second view based on the second conversational context.

8. The method of claim 7, wherein, when the first conversational context indicates that the conference participants includes a presenter, the first view is a primary view of the gallery view layout and the second view is a secondary view of the gallery view layout.

9. The method of claim 7, wherein, when the first conversational context indicates a conversation between two or more conference participants of the one or more conference participants and the second conversational context indicates that the one or more other conference participants is listening to the conversation between the two or more conference participants, the first view and the second view are each secondary views of the gallery view layout.

10. The method of claim 6, wherein the gallery view layout includes a fixed number of views.

11. An apparatus, comprising:
a memory; and
a processor configured to execute instructions stored in the memory to:
detect conference participants in a conference room based on an input video stream received from a video capture device located within the conference room;
determine a direction of audio associated with the conference participants based on an input audio stream received from an audio capture device located within the conference room;
determine, within a field of view of the video capture device based on the direction of the audio and locations of the conference participants in the conference room, a first region of interest to output within a first view of conferencing software and other regions of interest available for outputting within a second view of the conferencing software, wherein the first region of interest is associated with one or more first conference participants of the conference participants and the other regions of interest are associated with one or more second conference participants of the conference participants;
output, based on a conversational context within the conference room determined based on the direction of the audio and the locations of the one or more conference participants in the conference room, the first region of interest for display within the first view; and
change, based on the conversational context, between ones of the other regions of interest output for display within the second view while the first region of interest is output within the first view.

12. The apparatus of claim 11, wherein, to determine the first region of interest and the other regions of interest, the processor is configured to execute the instructions to:
determine the conversational context within the conference room based on the direction of the audio and the locations of the one or more conference participants in the conference room; and
determine the first region of interest and the other regions of interest based on the conversational context.

13. The apparatus of claim 12, wherein the conversational context corresponds to a context and length of a conversation between a first participant and a second participant of the conference participants, and wherein at least the first region of interest is determined using a machine learning model.

14. The apparatus of claim 12, wherein the conversational context is a first conversational context, and wherein, to determine the first region of interest and the other regions of interest based on the conversational context, the processor is configured to execute the instructions to:
determine to output the first region of interest for display within the first view based on an evaluation of the conversational context and a second conversational context used to determine a second region of interest.

15. The apparatus of claim 11, wherein, to detect the conference participants in the conference room based on the input video stream received from the video capture device located within the conference room, the processor is configured to execute the instructions to:
detect the conference participants by segmenting one or more humans identified based on the input video stream from a background identified based on the input video stream.

16. The apparatus of claim 11, wherein, to determine the direction of the audio from the conference participants based on the input audio stream received from the audio capture device located within the conference room, the processor is configured to execute the instructions to:
detect voice activity based on the input audio stream, wherein the direction of the audio indicates a direction from which the voice activity arrived at the audio capture device.

17. A non-transitory computer readable storage device including program instructions that, when executed by a processor, cause the processor to perform operations, the operations comprising:
determining, within a field of view of a video capture device based on locations of conference participants detected within a conference room and direction of audio determined based on voice activity detected within the conference room, a first region of interest to output within a first view of conferencing software and other regions of interest available for outputting within a second view of the conferencing software, wherein the first region of interest is associated with one or more first conference participants of the conference participants and the other regions of interest are associated with one or more second conference participants of the conference participants;

outputting, based on a conversational context within the conference room determined based on the direction of the audio and the locations of the one or more conference participants in the conference room, the first region of interest for display within the first view; and changing, based on the conversational context, between ones of the other regions of interest output for display within the second view while the first region of interest is output within the first view.

18. The non-transitory computer readable storage device of claim 17, wherein the operations for determining the first region of interest and the other regions of interest comprise:

determining the conversational context within the conference room based on the direction of the audio and the locations of the conference participants in the conference room; and determining the first region of interest and the other regions of interest based on the conversational context.

19. The non-transitory computer readable storage device of claim 18, the operations comprising:

determining a change in the conversational context;

determining a second region of interest to output within the first view based on the change in the conversational context; and outputting the second region of interest for display within the first view.

20. The non-transitory computer readable storage device of claim 19, wherein the first region of interest is determined using an input video stream received from the video capture device having the field of view within the conference room and the second region of interest is determined using an input video stream received from a second video capture device having a second field of view within the conference room.

\* \* \* \* \*